US012385545B2

(12) United States Patent
Slusarczyk et al.

(10) Patent No.: US 12,385,545 B2
(45) Date of Patent: Aug. 12, 2025

(54) DAMPER ASSEMBLY WITH FREQUENCY ADAPTIVE ORIFICE

(71) Applicant: BeijingWest Industries Co., Ltd., Beijing (CN)

(72) Inventors: Pawel Slusarczyk, Myslenice (PL); Bartlomiej Franczyk, Cracow (PL); Jakub Wrzesinski, Cracow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 499 days.

(21) Appl. No.: 17/723,421

(22) Filed: Apr. 18, 2022

(65) Prior Publication Data

US 2023/0296157 A1 Sep. 21, 2023

(30) Foreign Application Priority Data

Mar. 18, 2022 (CN) .................... 202210267856.X

(51) Int. Cl.
*F16F 9/516* (2006.01)
*F16F 9/19* (2006.01)
*F16F 9/36* (2006.01)

(52) U.S. Cl.
CPC ............... *F16F 9/516* (2013.01); *F16F 9/19* (2013.01); *F16F 9/369* (2013.01); *F16F 2228/04* (2013.01); *F16F 2230/30* (2013.01)

(58) Field of Classification Search
CPC ..................................................... F16F 9/516
See application file for complete search history.

(56) References Cited

U.S. PATENT DOCUMENTS 5,148,897 A 9/1992 Vanroye
9,534,653 B2 1/2017 Kim
(Continued)

FOREIGN PATENT DOCUMENTS

DE 2038984 A1 2/1972
EP 0632212 A2 1/1995
(Continued)

OTHER PUBLICATIONS

Extended European Search Report issued on Aug. 21, 2023 for counterpart European patent application No. 23161669.9.
(Continued)

*Primary Examiner* — Melody M Burch
(74) *Attorney, Agent, or Firm* — William H. Honaker; Dickinson Wright PLLC

(57) ABSTRACT

A damper assembly includes a housing having a tubular shape defining a main chamber extending along a center axis. A piston is movable along the center axis and divides the main chamber into a compression chamber and a rebound chamber. The piston includes a piston body defining a frequency-adaptive orifice (FAO) passage providing fluid communication between the compression chamber and the rebound chamber. The piston includes an FAO valve assembly having an FAO cover member configured to block fluid flow therethrough in response to application of a low-frequency excitation, and allowing fluid flow through the FAO passage in response to application of a high-frequency excitation. The FAO valve assembly also includes a tappet configured to translate relative to the piston body to bias the FAO cover member to selectively cover the FAO passage in response to the application of the low-frequency excitation.

15 Claims, 7 Drawing Sheets

(56) References Cited

U.S. PATENT DOCUMENTS

| | | |
|---|---|---|
| 10,774,895 B2 | 9/2020 | Yan |
| 2008/0314704 A1 | 12/2008 | Deferme |
| 2013/0333993 A1 | 12/2013 | Yu |
| 2014/0190778 A1 | 7/2014 | Gartner |
| 2015/0114774 A1 | 4/2015 | Kim |
| 2015/0276005 A1 | 10/2015 | Kim |
| 2016/0047432 A1 | 2/2016 | Nowaczyk et al. |
| 2018/0187738 A1 | 7/2018 | Forster |
| 2020/0215864 A1 | 7/2020 | Lizarraga Senar |

FOREIGN PATENT DOCUMENTS

| | | | | |
|---|---|---|---|---|
| EP | 1158202 A2 | | 11/2001 | |
| EP | 3828435 A1 | | 6/2021 | |
| EP | 3907419 A1 | | 11/2021 | |
| FR | 1331415 A | | 5/1962 | |
| JP | 53132673 A | | 11/1978 | |
| JP | 6110135 A | | 1/1986 | |
| JP | 0722145 U | | 4/1995 | |
| JP | 2000297836 A | | 10/2000 | |
| JP | 2014101964 A | | 6/2014 | |
| JP | 2019215040 A | * | 12/2019 | ............ F16F 9/3221 |
| KR | 20140081158 A | | 7/2014 | |
| WO | WO-2016084797 A1 | * | 6/2016 | ............. F16F 9/067 |
| WO | 2017089621 A1 | | 6/2017 | |
| WO | WO-2019022075 A1 | * | 1/2019 | ................ F16F 9/19 |

OTHER PUBLICATIONS

First Office Action issued on Jul. 18, 2023 for counterpart Chinese patent application No. 202210267856.X, along with machine EN translation.

* cited by examiner

DAMPER ASSEMBLY WITH FREQUENCY ADAPTIVE ORIFICE

CROSS-REFERENCE TO RELATED APPLICATIONS

This U.S. utility patent application claims priority to Chinese Patent Application No. 202210267856.X filed on Mar. 18, 2022, the contents of which are incorporated herein by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. One such a damper assembly is disclosed in Patent publication U.S. Pat. No. 5,706,920A which discloses a monotube damper assembly including a main tube disposed on a center axis and extending between a first end and a second end. The damper defines a fluid compartment between the first end and the second end for containing a working fluid. A main piston is slidably disposed in the fluid compartment dividing the fluid compartment into a rebound chamber and a compression chamber. A piston rod is disposed on the center axis extending along the center axis to a distal end and attached to the main piston for moving the main piston between a compression stroke and a rebound stroke.

Conventional, passive shock absorber valves offer a poor compromise between performance, safety and driving comfort. To improve this situation, active and semi-active suspensions are often proposed. They, however, require the use of additional sensors, ECUs and control algorithms, what makes them complicated and extremely expensive. For this reason, adaptive passive valves are becoming more and more popular and are desired by car manufacturers.

Various adaptive valve technologies provide damping characteristics that depend not only on damper velocity but also on excitation frequency. Such solutions allow to achieve high damping forces for low frequencies, related to body motions and low damping forces for high frequencies, related to vibrations of the wheels.

It is known in the art for damper assemblies to include a frequency-dependent valve assembly to provide the damper assembly with the ability to reduce the level of damping force for high frequency events to provide better comfort and road holding for occupants. However, known valve assemblies are generally expensive, complex and have limited capabilities for tuning. Furthermore, most existing frequency-dependent valves are configured as add-ons that are attached to an existing damper design. These add-on valves may significantly increase dead-length of a damper. Moreover, they often require drilling of additional, intersecting bypass holes, which is an expensive process that generates contaminants and can weakens portions of the damper, such as a valve tenon. Accordingly, an improved damper assembly is desired.

SUMMARY OF THE INVENTION

The present invention provides a damper assembly. The damper assembly includes a housing having a tubular shape extending along a center axis, and a piston movable through the housing along the center axis. The damper assembly also includes a body defining a frequency-adaptive orifice (FAO) passage providing fluid communication between a first chamber and a second chamber. The damper assembly also includes an FAO valve assembly having an FAO cover member configured to selectively cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency. The FAO valve assembly further includes a tappet configured to translate relative to the body to bias the FAO cover member to selectively cover the FAO passage in response to the application of the low-frequency excitation in an at least one of a compression direction or a rebound direction opposite the compression direction.

The present invention also provides a piston for a damper assembly. The piston includes a piston body defining a frequency-adaptive orifice (FAO) passage for providing fluid communication between a compression chamber and a rebound chamber. The piston also includes an FAO valve assembly having an FAO cover member configured to selectively cover the FAO passage to block fluid flow therethrough in response to application of a low-frequency excitation below a predetermined frequency. The FAO valve assembly is further configured to allow fluid flow through the FAO passage in response to application of a high-frequency excitation above the predetermined frequency. The FAO valve assembly further includes a tappet configured to translate relative to the piston body to bias the FAO cover member to selectively cover the FAO passage in response to the application of the low-frequency excitation in an at least one of a compression direction or a rebound direction opposite the compression direction.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, it is one aspect of the present invention to provide a damper assembly 20, which may be used as a part of a suspension in a vehicle, such as a passenger car or truck. The damper assembly 20 of the present disclosure is shown as a monotube damper. However, the principles of the present disclosure may be used with other types of dampers, such as in a twin-tube damper.

The damper assembly 20 of the present disclosure provides a unique solution for the implementation of a Frequency Adaptive Orifice (FAO) within a piston valve assembly.

Figure 1:
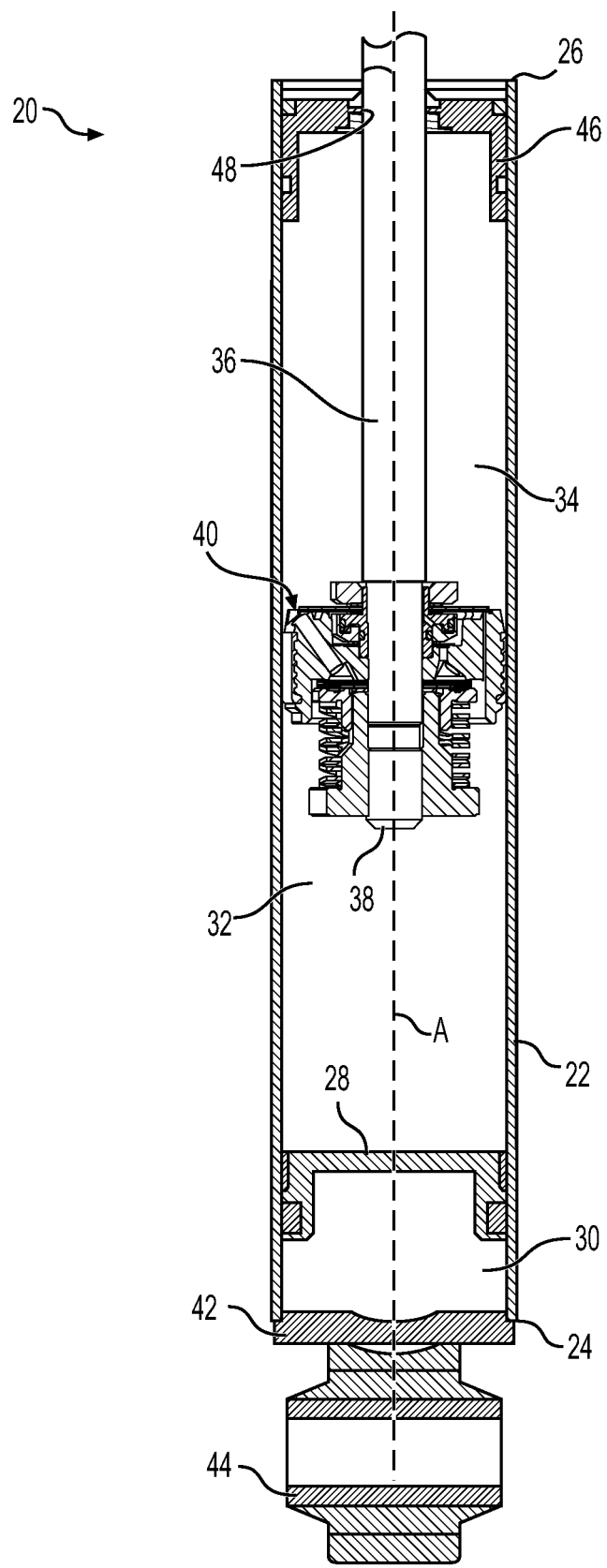
FIG. 1 shows a cross-sectional perspective view of a damper assembly.

As generally shown in FIG. 1, the damper assembly 20 includes a housing 22 having a tubular shape extending along a center axis A between a first end 24 and a second end 26 and defining a main compartment 30, 32, 34 therein. The damper assembly 20 also includes a gas cup 28 disposed in the main compartment 30, 32, 34 in sealing engagement with the housing 22 and slidable along the center axis A to divide the main compartment 30, 32, 34 into a gas compartment 30 for containing a gas and a fluid compartment 32, 34. The gas compartment 30 extends between the first end 24 and the gas cup 28, and the fluid compartment 32, 34 extends between the gas cup 28 and the second end 26.

The damper assembly 20 also includes a damper rod 36 that extends along the center axis A. The damper rod 36 includes a rod end 38 located inside of the fluid compartment 32, 34. A piston 40 is attached to the damper rod 36 adjacent to the rod end 38, and configured to move with the damper rod 36 along the center axis A through the housing 22. The piston 40 divides the fluid compartment 32, 34 into a compression chamber 32 and a rebound chamber 34. The compression chamber 32 extends between the piston 40 and the gas cup 28, and the rebound chamber 34 extends between the second end 26 and the piston 40.

A first closure 42 seals the gas compartment 30 at the first end 24 of the housing 22. A damper mount 44 is attached to the first closure 42 and configured to attach the damper assembly 20 to a body of a vehicle (not shown). The damper assembly 20 of the present disclosure may be used in other configurations and/or orientations. For example, the damper mount 44 may connect the housing 22 of the damper assembly 20 to a chassis component of the vehicle 10.

The damper assembly 20 also includes a second closure 46 disposed adjacent to the second end 26 of the housing 22 to enclose the rebound chamber 34. The second closure 46 defines a bore 48 for the damper rod 36 to pass through. The second closure 46 may provide a fluid-tight seal with the damper rod 36 to prevent fluid from leaking out of the rebound chamber 34.

Figure 2:
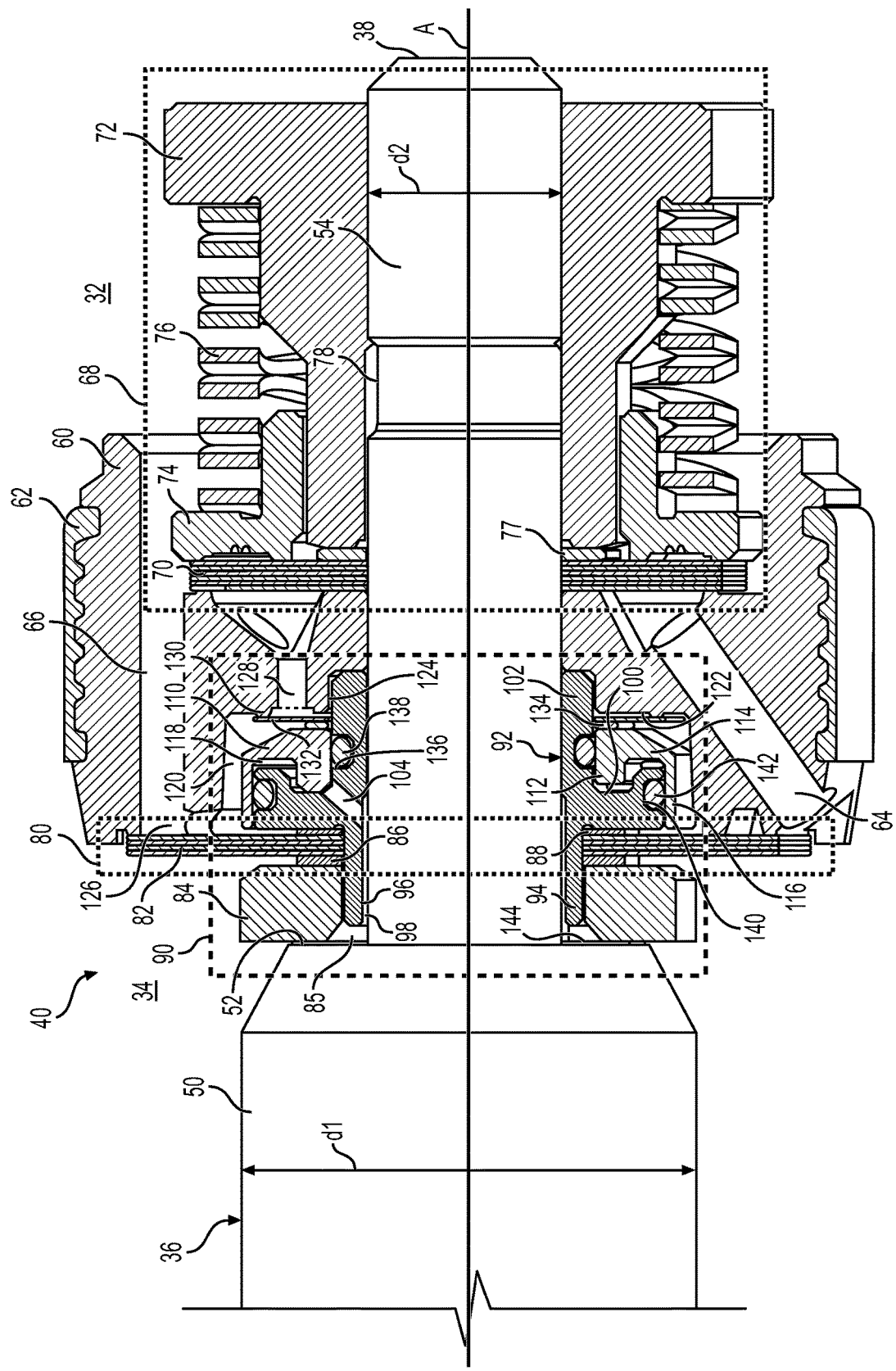
FIG. 2 shows an enlarged cross-sectional perspective view of a piston of the damper assembly, including a frequency-adaptive orifice valve.

FIG. 2 shows an enlarged cross-sectional perspective view of the piston 40 of the present disclosure. As shown in FIG. 2, the damper rod 36 includes a rod body 50 having a cylindrical shape with a first diameter d1, a rod shoulder 52 spaced apart from and facing toward the rod end 38. The damper rod 36 also includes a rod extension 54 extending from the rod shoulder 52 to the rod end 38 and having a generally cylindrical shape with a second diameter d2 smaller than the first diameter d1.

As also shown in FIG. 2, the piston 40 includes a piston body 60 disposed around the rod extension 54. The piston body 60 includes an annular seal 62 of resilient material configured to seal against an inner surface of the housing 22 (not shown in FIG. 2). The piston body 60 defines a rebound passage 64 in fluid communication with the rebound chamber 34 and providing a path for fluid flow to the compression chamber 32. The piston body 60 also defines a compression passage 66 in fluid communication with the compression chamber 32 and providing a path for fluid flow to the rebound chamber 34.

The piston 40 also includes a rebound valve assembly 68 configured to regulate fluid flow from the rebound chamber 34 to the compression chamber 32 during a rebound stroke, with the damper rod 36 pulling the piston 40 toward the second end 26. The rebound valve assembly 68 includes a rebound disc stack 70 including a plurality of discs covering an end of the rebound passage 64 opposite from the rebound chamber 34 and configured to deflect away from the rebound passage 64 in response to a pressure differential thereacross, and to thereby regulate fluid flow through the rebound passage 64 and into the compression chamber 32.

The rebound valve assembly 68 also includes a shoulder nut 72 and a spring seat 74, with a spring 76 extending therebetween to bias the rebound disc stack 70 to cover the rebound passage 64. A rebound spacer disc 77 having a disc shape is disposed around the rod extension 54 between the rebound disc stack 70 and the shoulder nut 72. The rebound spacer disc 77 has a smaller diameter than the rebound disc stack 70 for supporting an inner region of the rebound disc stack 70 while allowing a radially outer portion of the rebound disc stack 70 to deflect axially away from the piston body 60 for regulating the fluid flow through the rebound passage 64.

The piston 40 also includes a compression valve assembly 80 configured to regulate fluid flow from the compression chamber 32 to the rebound chamber 34 during a compression stroke, with the damper rod 36 pushing the piston 40 toward the first end 24 of the housing 22. The compression valve assembly 80 includes a compression disc stack 82 having a plurality of discs covering an end of the compression passage 66 opposite from the compression chamber 32. The compression disc stack 82 is configured to deflect away from the compression passage 66 in response to a pressure differential thereacross, and to thereby regulate fluid flow through the compression passage 66 and into the rebound chamber 34.

As can be seen in FIG. 2, the compression valve assembly 80 includes a compression disc retainer 84 having a ring shape disposed about the rod extension 54 between the rod shoulder 52 and the compression disc stack 82. The compression valve assembly 80 also includes a first spacer disc 86 disposed around the rod extension 54 adjacent to the compression disc stack 82 and between the compression disc retainer 84 and the compression disc stack 82. The first spacer disc 86 has a smaller diameter than the compression disc stack 82 for supporting an inner region of the compression disc stack 82 while allowing a radially outer portion of the compression disc stack 82 to deflect axially away from the piston body 60 for regulating the fluid flow through the compression passage 66. The compression valve assembly 80 also includes a second spacer disc 88 having a disc shape disposed around the rod extension 54 adjacent to the compression disc stack 82 and opposite from the first spacer disc 86. The thickness of the second spacer disc 88 may define a preload of the compression disc stack 82. The compression disc retainer 84 and the rod extension 54 together define a lower chamber 85 adjacent to the rod shoulder 52.

The piston 40 also includes a frequency-adaptive orifice (FAO) valve assembly 90 that includes a guiding sleeve 92 disposed around the rod extension 54. The guiding sleeve 92 includes a proximal tubular portion 94 having a tubular shape disposed around and coaxial with the rod extension 54 and adjacent to the rod shoulder 52. The proximal tubular portion 94 has a first inner surface 96 that is spaced apart from the rod extension 54 to define a first balance passage 98 therebetween. The guiding sleeve 92 also includes a disc-shaped portion 100 extending radially outwardly from an end of the proximal tubular portion 94 spaced apart from the rod shoulder 52. The disc-shaped portion 100 is disposed annularly about the proximal tubular portion 94 of the guiding sleeve 92. The guiding sleeve 92 also includes a distal tubular portion 102 having a tubular shape and extending axially from the disc-shaped portion 100 away from the rod shoulder 52. The distal tubular portion 102 is disposed coaxially with and tightly against the rod extension 54, with little to no space therebetween. The guiding sleeve 92 further defines a second balance passage 104 extending radially outwardly from the first balance passage 98 and axially through the disc-shaped portion 100. The compression valve assembly 80 is disposed around the proximal tubular portion 94 of the guiding sleeve 92, with the second spacer disc 88 separating the compression disc stack 82 from the disc-shaped portion 100. The distal tubular portion 102 of the guiding sleeve 92 further defines a plurality of indentations 106 in an outer surface thereof.

The FAO valve assembly 90 also includes a tappet 110 having a ring shape disposed around and engaging the guiding sleeve 92 and configured to translate relative to the piston body 60 in an axial direction. The tappet 110 includes an inner tubular portion 112 disposed around the distal tubular portion 102 of the guiding sleeve 92 and configured to slide therealong. The tappet 110 further includes a flange portion 114 having an annular shape extending radially outwardly from the inner tubular portion 112. The tappet 110 also includes an outer tubular portion 116 extending annularly around the flange portion 114 and axially toward the rod shoulder 52. The outer tubular portion 116 of the tappet 110 is disposed annularly around the disc-shaped portion 100 of the guiding sleeve 92 and is configured to slide therealong. The tappet 110 defines a tappet chamber 118 surrounded by the outer tubular portion 116 and extending between the flange portion 114 and the disc-shaped portion 100 of the guiding sleeve 92.

The piston body 60 defines an FAO chamber 120 having a generally cylindrical shape coaxially surrounding the rod extension 54, with a lower wall 122 facing toward the rod shoulder 52. The guiding sleeve 92 and the tappet 110 are disposed within the FAO chamber 120. The piston body 60 also defines an inner bore 124 having a cylindrical shape coaxially surrounding the rod extension 54 extending in an axial direction from the lower wall 122 away from the rod shoulder 52. The inner bore 124 is configured to receive an end of the distal tubular portion 102 of the guiding sleeve 92 for locating the guiding sleeve 92 with the piston body 60.

The piston body 60 also defines a first FAO passage 126 providing fluid communication between the compression passage 66 and the FAO chamber 120. The piston body 60 further defines a second FAO passage 128 providing fluid communication between the rebound passage 64 and the FAO chamber 120. The piston body 60 also includes an annular protrusion 130 extending in an axial direction from the lower wall 122 and into the FAO chamber 120 adjacent to and radially outwardly from the second FAO passage 128.

The FAO valve assembly 90 further includes an FAO cover member 132 configured to selectively cover the second FAO passage 128 to block fluid flow therethrough. The FAO cover member 132 may be formed as a disc that is disposed annularly around the distal tubular portion 102 of the guiding sleeve 92 abutting the annular protrusion 130, as shown in FIG. 2. However, the FAO cover member 132 could have a different shape or configuration. The FAO valve assembly 90 also includes an FAO spacer 134 having a ring shape disposed annularly around the distal tubular portion 102 of the guiding sleeve 92 and between the tappet 110 and the FAO cover member 132.

The distal tubular portion 102 of the guiding sleeve 92 includes an outer surface defining a first seal slot 136 holding a first O-ring seal 138 that seals against an inner surface of the inner tubular portion 112 of the tappet 110. The disc-shaped portion 100 of the guiding sleeve 92 includes an outer surface defining a second seal slot 140 holding a second O-ring seal 142 that seals against an inner surface of the outer tubular portion 116 of the tappet 110.

The FAO valve assembly 90 also includes a valve control disc 144 having an annular shape and disposed adjacent to the rod shoulder 52 and between the rod shoulder 52 and the compression disc retainer 84. As best shown on FIG. 3, valve control disc 144 defines a control orifice 146 that extends at least partially through the valve control disc 144 in a radial direction from an outer edge thereof for providing fluid communication between the rebound chamber 34 and the lower chamber 85.

Referring back to FIG. 2, the first balance passage 98 and the second balance passage 104 together provide fluid communication between the lower chamber 85 and the tappet chamber 118 to pressurize the tappet chamber 118 during a rebound stroke. This pressurization of the tappet chamber 118 causes the tappet 110 to be biased away from the rod shoulder 52 and toward the FAO cover member 132, thereby causing the FAO cover member 132 to cover the second FAO passage 128 and to prevent fluid flow therethrough.

The FAO cover member 132 is supported by the tappet 110 that preloads the FAO cover member 132 depending on a volume of fluid, such as oil, and pressure in the tappet chamber 118. The tappet chamber 118 is supplied with oil from the rebound chamber 34 via the valve control disc 144, which is located between the rod shoulder 52 and the compression disc retainer 84. According to an aspect of the present disclosure, the FAO cover member 132 works in both directions, and thus provide extended functionality in both rebound and compression strokes.

Figure 3:
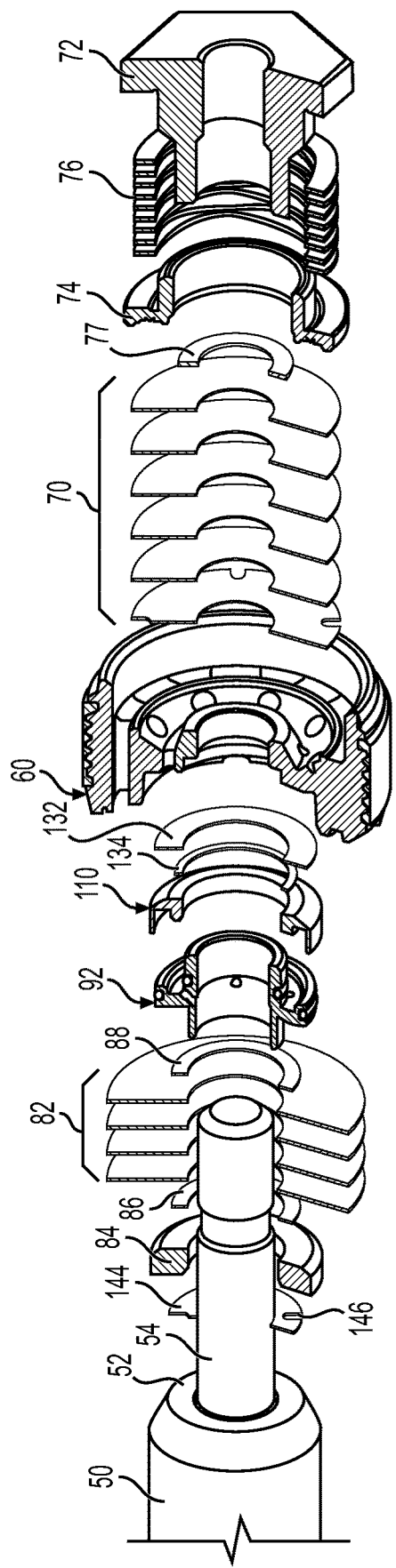
FIG. 3 shows an exploded view of the piston of the damper assembly including the frequency-adaptive orifice valve.
Figure 4:
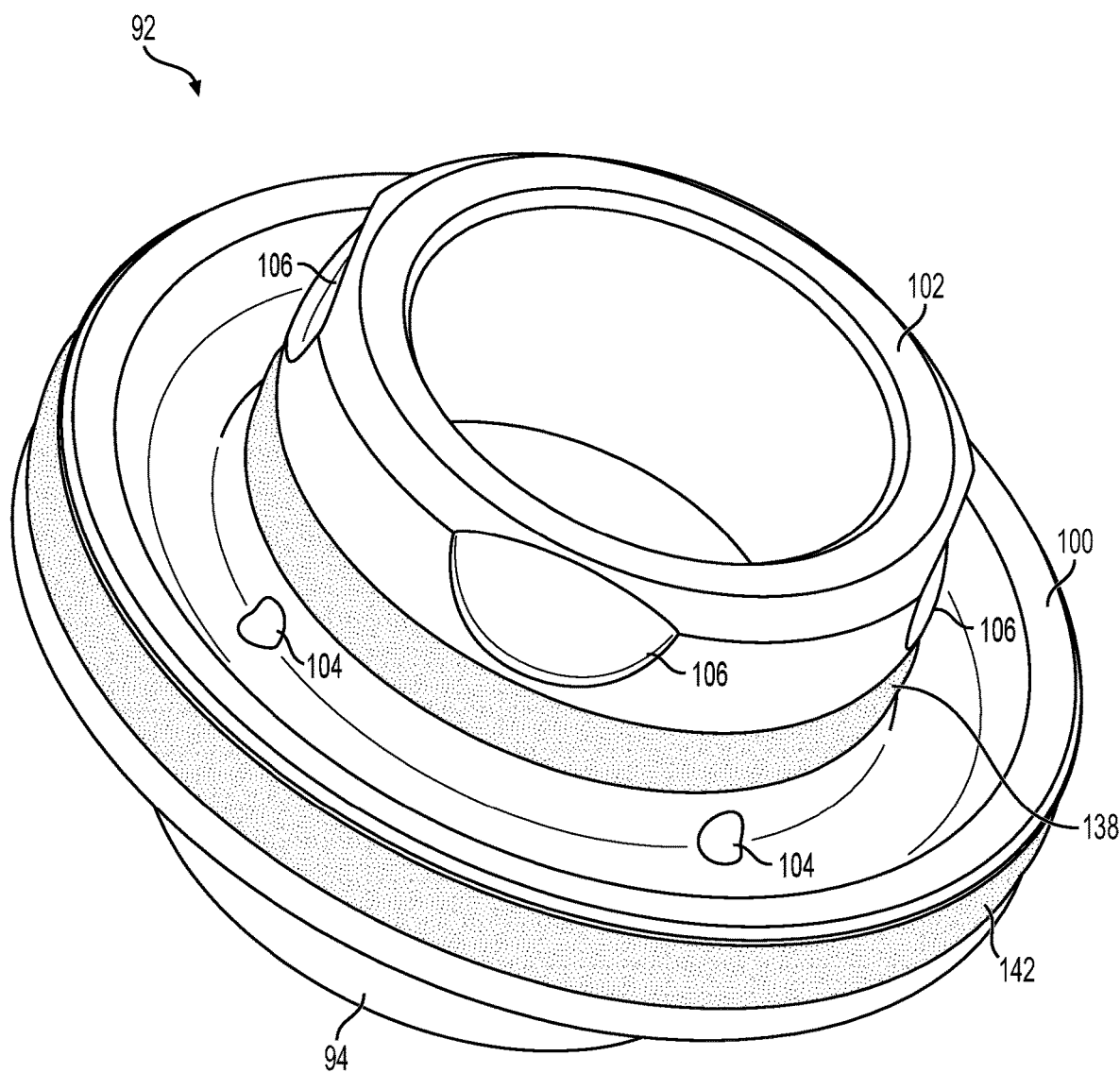
FIG. 4 shows a perspective view of a guiding sleeve for the frequency-adaptive orifice valve of the present disclosure.
Figure 5A:
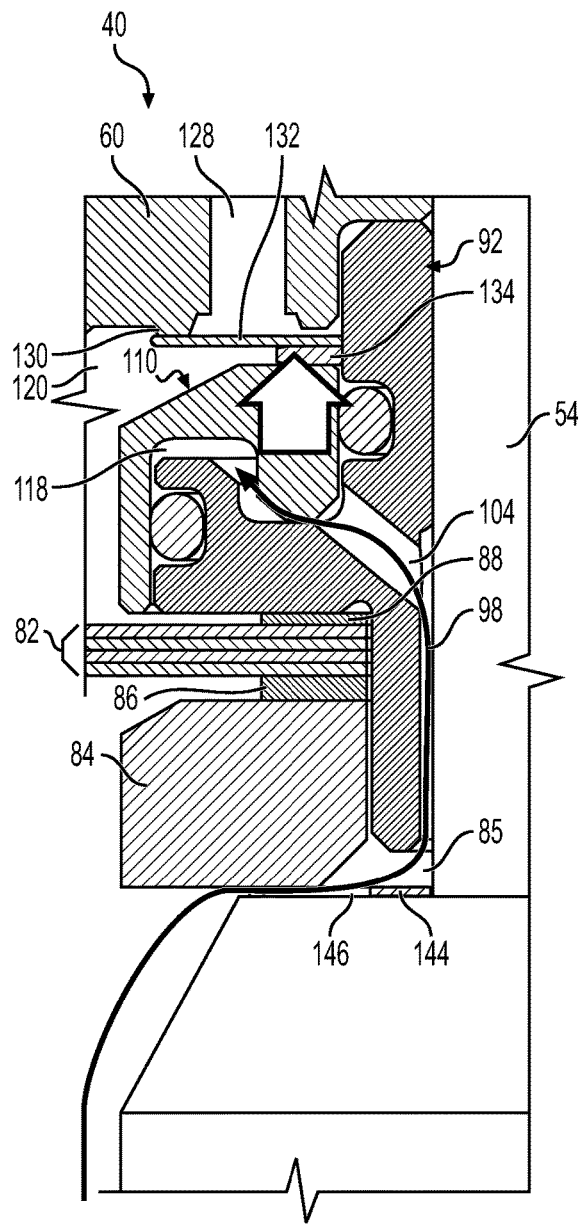
FIG. 5A shows an enlarged cross-sectional fragmentary view of the piston, showing fluid flow therethrough during application of a low-frequency excitation.

FIG. 3 shows an exploded view of the piston 40 including the FAO valve assembly 90. FIG. 4 shows a perspective view of the guiding sleeve 92. FIG. 5A shows an enlarged cross-sectional fragmentary view of the piston 40, showing fluid flow therethrough during application of a low-frequency excitation, below a predetermined frequency. During low-frequency operation, shown in FIG. 5A, the throttling effect of the control orifice 146 is low, so the tappet chamber 118 surrounded is effectively fed with fluid through the valve control disc 144 and the balance passages 98, 104. Pressure in the tappet chamber 118 is relatively high, and the tappet 110 is forced against the FAO cover member 132, thus increasing its preload.

Figure 5B:
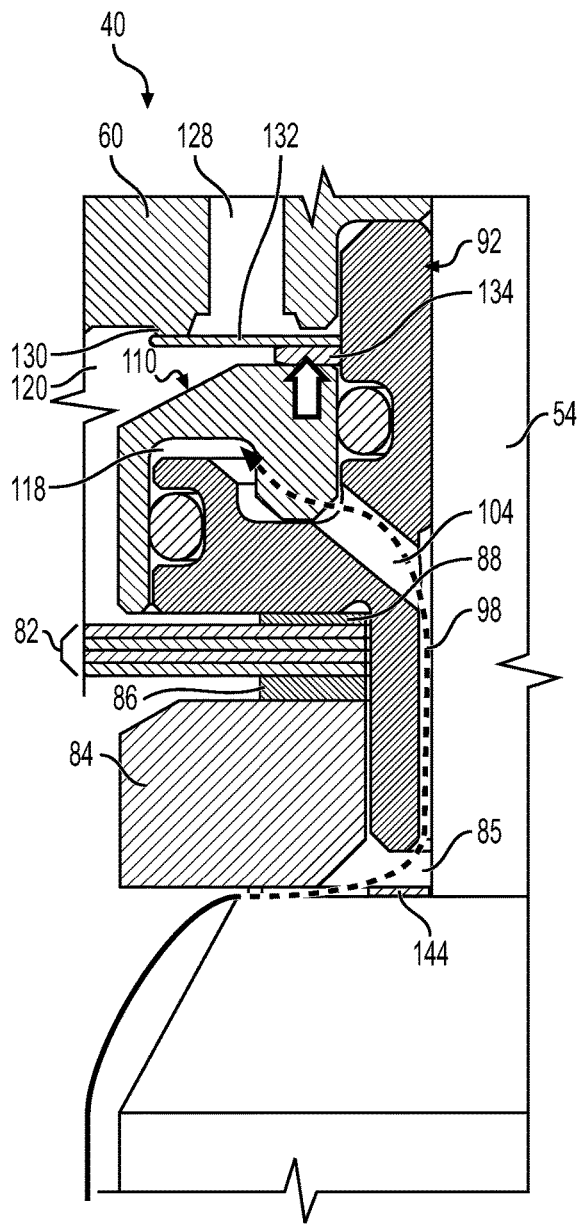
FIG. 5B shows an enlarged cross-sectional fragmentary view of the piston, showing fluid flow therethrough during application of a high-frequency excitation.

FIG. 5B shows an enlarged cross-sectional fragmentary view of the piston 40, showing fluid flow therethrough with the damper assembly 20 during application of a high-frequency excitation, above the predetermined frequency. During high-frequency operation, the FAO cover member 132 throttles the flow of fluid, and so there is high pressure drop between the rebound chamber 34 and the tappet chamber 118. Pressure acting on the tappet 110, and thereby preload of the FAO cover member 132 is relatively small, making the FAO valve assembly 90 less stiff.

Figure 6A:
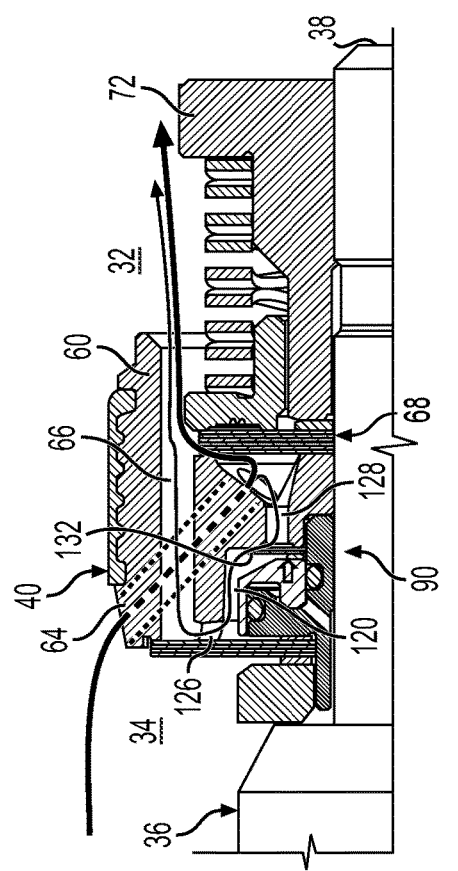
FIG. 6A shows an enlarged cross-sectional fragmentary view of the piston during a rebound stroke, in a low-frequency state, and showing fluid flow therethrough.
Figure 6B:
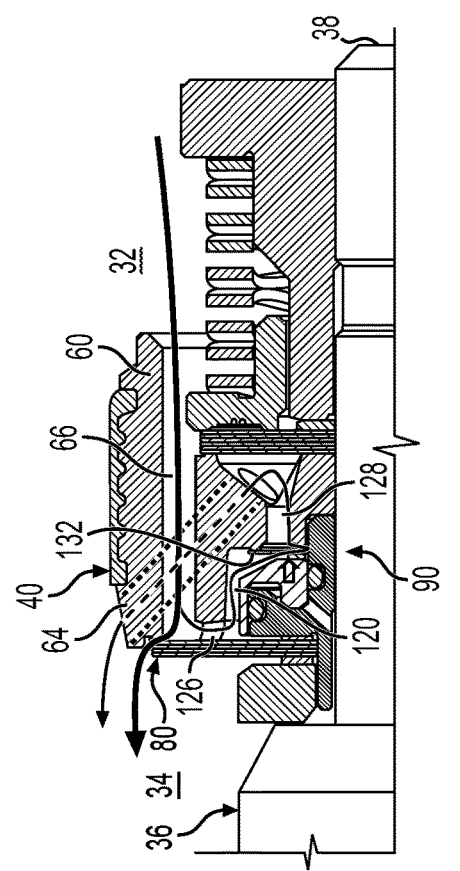
FIG. 6B shows an enlarged cross-sectional fragmentary view of the piston during a rebound stroke, in a high-frequency state, and showing fluid flow therethrough.

FIG. 6A shows an enlarged cross-sectional fragmentary view of the piston 40 during a rebound stroke, in a low-frequency state, and showing fluid flow therethrough. FIG. 6A shows the FAO valve assembly 90 in an inactive state, with the FAO cover member 132 blocking fluid flow through the second FAO passage 128. The FAO cover member 132 may be biased to block the second FAO passage 128 during the rebound stroke, preventing fluid flow therethrough. For example, the tappet 110 may press the FAO cover member 132 to block the second FAO passage 128 by fluid pressure in the tappet chamber 118 being greater than a fluid pressure in the FAO chamber 120. FIG. 6B shows an enlarged cross-sectional fragmentary view of the piston 40 during a rebound stroke, in a high-frequency state, and showing fluid flow therethrough. The FAO valve assembly 90 may allow fluid flow through one or more FAO passages 126, 128 in response to application of a high-frequency excitation above a predetermined frequency. The predetermined frequency may also be called a cutoff frequency.

As shown in FIG. 6B, the FAO valve assembly 90 provides a rebound bypass fluid path from the rebound chamber 34 to the compression chamber 32, bypassing the rebound valve assembly 68, in response to a high-frequency rebound excitation applied to the piston 40. The FAO valve assembly thereby reduces the force generated by the damper assembly 20 in response to the high-frequency rebound excitation by allowing fluid flow through the rebound bypass fluid path. The FAO valve assembly 90 also blocks the rebound bypass fluid path in response to a low-frequency rebound excitation applied to the piston 40, as shown in FIG. 6A.

The rebound bypass fluid path through the FAO valve assembly 90 is illustrated in FIG. 6B and includes the FAO passages 126, 128. More specifically, the rebound bypass fluid path includes fluid flow from the rebound chamber 34, through the rebound passage 64 and the second FAO passage 128, past the FAO cover member 132 and into the FAO chamber 120. The rebound bypass fluid path then includes the fluid flowing from the FAO chamber 120 through the first FAO passage 126 and the compression passage 66 and then to the compression chamber 32. In this case, rebound damping force is decreased.

Figure 7A:
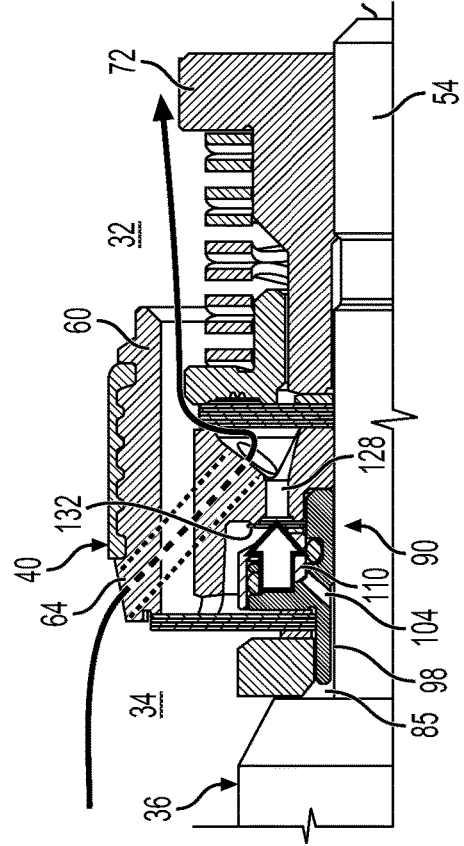
FIG. 7A shows an enlarged cross-sectional fragmentary view of the piston during a compression stroke, in a low-frequency state, and showing fluid flow therethrough.
Figure 7B:
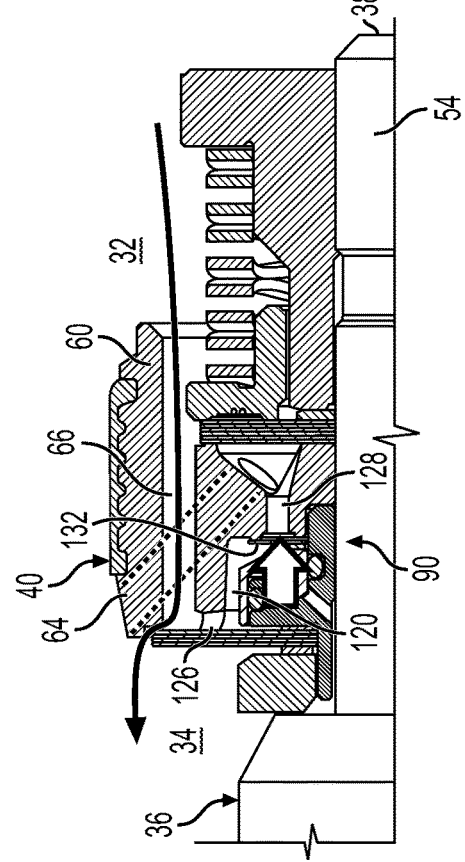
FIG. 7B shows an enlarged cross-sectional fragmentary view of the piston during a compression stroke, in a high-frequency state, and showing fluid flow therethrough.

FIG. 7A shows an enlarged cross-sectional fragmentary view of the piston 40 during a compression stroke, in a low-frequency state, and showing fluid flow therethrough. FIG. 7A shows the FAO valve assembly 90 in an inactive state, with the FAO cover member 132 blocking fluid flow through the second FAO passage 128. In this inactive state, the FAO cover member 132 may be biased to block the second FAO passage 128 during the compression stroke, preventing fluid flow therethrough. For example, the FAO cover member 132 may be deflected to block the second FAO passage 128 by fluid pressure in the FAO chamber 120 being greater than a fluid pressure in the second FAO passage 128. FIG. 7B shows an enlarged cross-sectional fragmentary view of the piston 40 during a compression stroke, in a high-frequency state, and showing fluid flow therethrough.

As shown in FIG. 7B, the FAO valve assembly 90 provides compression bypass fluid path from the compression chamber 32 to the rebound chamber 34, bypassing the compression valve assembly 80, in response to a high-frequency compression excitation applied to the piston 40. The FAO valve assembly thereby reduces the force generated by the damper assembly 20 in response to a high-frequency compression excitation by allowing fluid flow through the compression bypass fluid path. The FAO valve assembly 90 also blocks the compression bypass fluid path in response to a low-frequency compression excitation, as shown in FIG. 7A.

The compression bypass fluid path through the FAO valve assembly 90 is illustrated in FIG. 7B and includes the FAO passages 126, 128. More specifically, the compression bypass fluid path includes fluid flow from the compression chamber 32, through the compression passage 66 and the first FAO passage 126, and into the FAO chamber 120. The compression bypass fluid path then includes the fluid flowing from the FAO chamber 120, past the FAO cover member 132, through the second FAO passage 128 and the rebound passage 64, and then to the rebound chamber 34. The indentations 106 in the distal tubular portion 102 of the guiding sleeve 92 (shown in FIG. 4) may provide a path for fluid flow from the FAO chamber 120 and to the second FAO passage 128 when the FAO cover member 132 is deflected toward the piston body 60, as shown in FIG. 7B.

The operating characteristics of the FAO valve assembly 90 can be adjusted by one or more of: oil flow area of the control orifice 146 (e.g. number and width of slots), a number and thickness of working discs comprising the FAO cover member 132, a number and/or cross-sectional area of the first FAO passages 126 and/or second FAO passages 128 in the piston body 60, and/or a thickness of the FAO spacer 134 that defines a nominal working disc preload of the FAO cover member 132.

Figure 8:
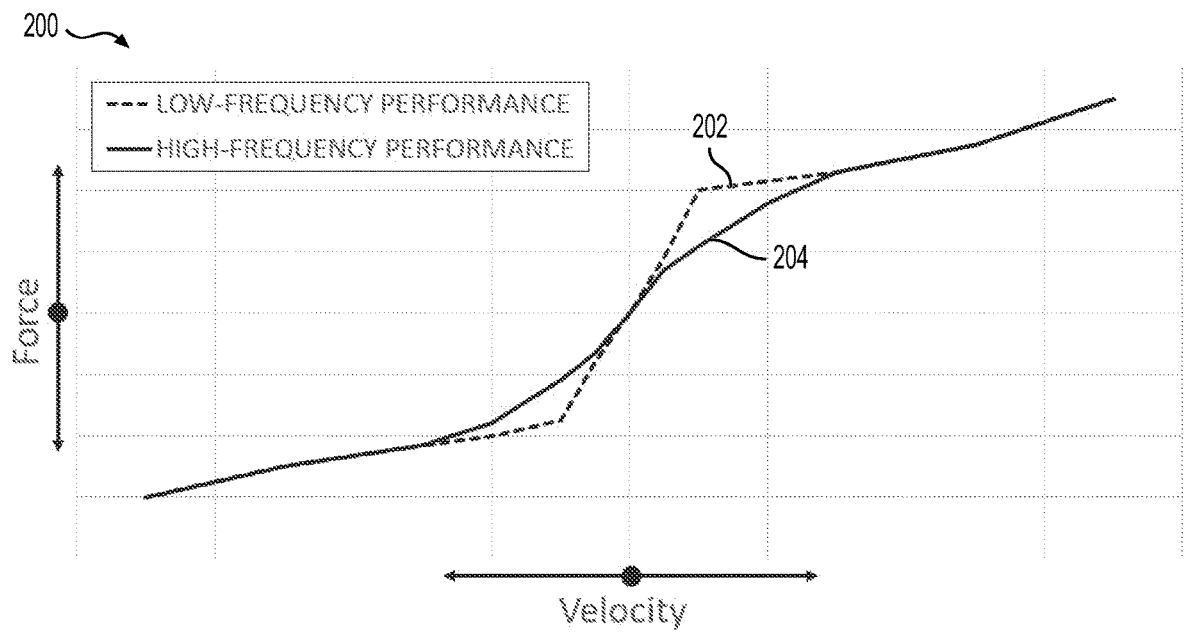
FIG. 8 shows a graph illustrating rebound force vs. velocity characteristics of a damper with the frequency-adaptive orifice valve of the present disclosure under standard and high-frequency conditions.
Figure 9:
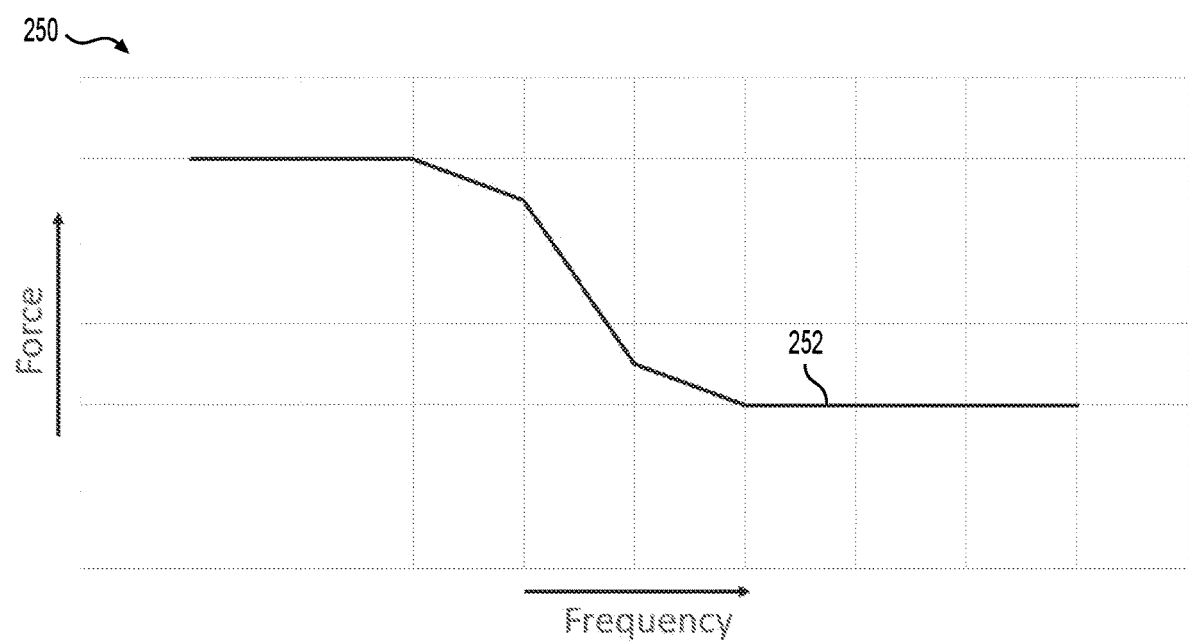
FIG. 9 shows a graph illustrating rebound force vs. stroking frequency of a damper with the frequency-adaptive orifice valve of the present disclosure and at constant velocity of 0.131 meters/second.

FIG. 8 shows a first graph 200 illustrating rebound force vs. velocity characteristics of a damper with the frequency-adaptive orifice valve of the present disclosure under standard and high-frequency conditions. The first graph 200 includes a first plot 202 showing force vs. velocity for the damper under low-frequency excitation conditions. The first graph 200 also includes a second plot 204 showing force vs. velocity for the damper under high-frequency excitation conditions. FIG. 9 shows a second graph 250 with a plot 252 showing rebound force vs. stroking frequency of a damper with the frequency-adaptive orifice valve of the present disclosure and at constant velocity. The FAO valve assembly 90 may be adjusted or tuned to provide any predetermined cutoff frequency ranging from about 2.0 Hz to about 12 Hz.

The FAO valve assembly 90 of the present disclosure is shown and described as located within a compression side of the piston 40. However, other configurations are possible. For example, the FAO valve assembly 90 may be located on the rebound side of the piston 40 or on both sides of the piston 40, simultaneously. Alternatively or additionally, an FAO valve may be disposed within a compression valve assembly (i.e. a base valve assembly) of a twin-tube damper assembly. Such a twin-tube damper may include an inner tube disposed within the housing 22 and defining a main chamber within the inner tube and an exterior chamber between the inner tube and the housing 22, wherein the piston divides the main chamber into a compression chamber and a rebound chamber. A twin-tube damper may also include a base assembly including a base valve configured to regulate fluid flow between the main chamber and the exterior chamber. The base assembly may include the body that defines the FAO passage.

According to an aspect of the present disclosure, a damper assembly is provided. The damper assembly includes a housing having a tubular shape extending along a center axis; a piston movable through the housing along the center axis; a body defining a frequency-adaptive orifice (FAO) passage providing fluid communication between a first chamber and a second chamber; and an FAO valve assembly having an FAO cover member configured to selectively cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency. The FAO valve assembly further comprises a tappet configured to translate relative to the body to bias the FAO cover member to selectively cover the FAO passage in response to the application of the low-frequency excitation in an at least one of a compression direction or a rebound direction opposite the compression direction.

In some embodiments, the housing defines a main chamber, the piston divides the main chamber into a compression chamber and a rebound chamber, the first chamber includes the compression chamber, and the second chamber includes the rebound chamber. In some embodiments, the piston includes a piston body and the piston body is the body defining the FAO passage.

In some embodiments, the tappet is configured to bias the FAO cover member to selectively cover the FAO passage in response to the application of the low-frequency excitation in the rebound direction.

In some embodiments, the piston body defines an FAO chamber with the tappet disposed therein; and the FAO chamber is in fluid communication with the compression chamber.

In some embodiments, the piston body defines a rebound passage in fluid communication with the rebound chamber; the piston further comprises a rebound valve assembly including a rebound disc stack covering an end of the rebound passage to regulate fluid flow from the rebound chamber to the compression chamber during a rebound stroke; and the FAO passage extends between the rebound passage and the FAO chamber to provide fluid communication therebetween.

In some embodiments, the damper assembly further includes a damper rod extending along the center axis and including a rod end located within the main chamber; the piston is attached to the damper rod adjacent to the rod end; the piston further comprises a guiding sleeve disposed about the damper rod; and the tappet has ring shape disposed around and engaging the guiding sleeve.

In some embodiments, the piston further comprises a compression valve assembly configured to regulate fluid flow from the compression chamber to the rebound chamber during a compression stroke, the compression valve assembly including a compression disc stack disposed annularly around the guiding sleeve.

In some embodiments, the guiding sleeve includes a distal tubular portion disposed coaxially with and tightly against the damper rod; and the tappet is disposed around the distal tubular portion and is configured to slide therealong.

In some embodiments, the distal tubular portion of the guiding sleeve includes an outer surface defining a first seal slot receiving a first O-ring seal for sealing against an inner surface of the tappet.

In some embodiments, the guiding sleeve further includes a disc-shaped portion that extends annularly around the damper rod and radially outwardly from the distal tubular portion; the tappet includes an inner tubular portion disposed around the distal tubular portion of the guiding sleeve and configured to slide therealong; the tappet further includes a flange portion and an outer tubular portion, the flange portion having an annular shape extending radially outwardly from the inner tubular portion, the outer tubular portion extending annularly around the flange portion; and the outer tubular portion of the tappet is disposed annularly around the disc-shaped portion of the guiding sleeve and configured to slide therealong.

In some embodiments, the tappet and the guiding sleeve together define a tappet chamber extending between the flange portion of the tappet and the disc-shaped portion of the guiding sleeve; and the tappet chamber is in fluid communication with the rebound chamber via a balance passage.

In some embodiments, the disc-shaped portion of the guiding sleeve includes an outer surface defining a second seal slot with a second O-ring seal disposed therein and sealing against an inner surface of the outer tubular portion of the tappet.

In some embodiments, the tappet defines, at least in part, a tappet chamber; wherein the tappet chamber is in fluid communication with the rebound chamber via a balance passage; and the guiding sleeve defines, at least in part, the balance passage.

In some embodiments, the guiding sleeve includes a proximal tubular portion having a tubular shape disposed around the damper rod and spaced apart therefrom to define, at least in part, the balance passage therebetween.

In some embodiments, the tappet defines, at least in part, a tappet chamber; the tappet chamber is in fluid communication with the rebound chamber via a balance passage; and the FAO valve assembly further comprises a control orifice configured to restrict fluid flow between the rebound chamber and the tappet chamber.

In some embodiments, the damper assembly further comprises a damper rod extending along the center axis and including a rod end located within the main chamber; the piston is attached to the damper rod adjacent to the rod end; the damper rod includes a rod body having a first diameter, a rod shoulder spaced apart from and facing toward the rod end, and a rod extension extending from the rod shoulder to the rod end and having a second diameter smaller than the first diameter; and the FAO valve assembly further comprises a valve control disc disposed around the rod extension and defining, at least in part, the control orifice.

According to an aspect of the present disclosure, a piston for a damper assembly is provided. The piston includes: a piston body defining a frequency-adaptive orifice (FAO) passage for providing fluid communication between a compression chamber and a rebound chamber; an FAO valve assembly having an FAO cover member configured to selectively cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency; and the FAO valve assembly further includes a tappet configured to translate relative to the piston body to bias the FAO cover member to selectively cover the FAO passage in response to the application of the low-frequency excitation in an at least one of a compression direction or a rebound direction opposite the compression direction.

In some embodiments, the piston further includes a guiding sleeve; and the tappet has ring shape disposed around and engaging the guiding sleeve.

In some embodiments, the guiding sleeve includes a distal tubular portion having a tubular shape; and the tappet is disposed around the distal tubular portion and is configured to slide therealong.

In some embodiments, the guiding sleeve further includes a disc-shaped portion that extends radially outwardly from the distal tubular portion; the tappet includes an inner tubular portion disposed around the distal tubular portion of the guiding sleeve and configured to slide therealong; the tappet further includes a flange portion and an outer tubular portion, the flange portion having an annular shape extending radially outwardly from the inner tubular portion, the outer tubular portion extending annularly around the flange portion; and the outer tubular portion of the tappet is disposed annularly around the disc-shaped portion of the guiding sleeve and configured to slide therealong.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A damper assembly comprising:
   a housing having a tubular shape extending along a center axis;
   a piston movable through the housing along the center axis;
   a body defining a frequency-adaptive orifice (FAO) passage providing fluid communication between a first chamber and a second chamber;
   an FAO valve assembly having an FAO cover member configured to cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency; and
   the FAO valve assembly further comprising a tappet configured to translate relative to the body to bias the FAO cover member to cover the FAO passage in response to the application of the low-frequency excitation in an at least one of a compression direction or a rebound direction opposite the compression direction,
   wherein the housing defines a main chamber, the piston divides the main chamber into a compression chamber and a rebound chamber, the first chamber includes the compression chamber, and the second chamber includes the rebound chamber; and
   wherein the piston includes a piston body and the piston body is the body defining the FAO passage,
   wherein the piston body defines an FAO chamber with the tappet disposed therein; and
   wherein the FAO chamber is in fluid communication with the compression chamber,
   wherein the piston body defines a rebound passage in fluid communication with the rebound chamber;
   wherein the piston further comprises a rebound valve assembly including a rebound disc stack covering an end of the rebound passage to regulate fluid flow from the rebound chamber to the compression chamber during a rebound stroke; and
   wherein the FAO passage extends between the rebound passage and the FAO chamber to provide fluid communication therebetween.

2. The damper assembly of claim 1, wherein the tappet is configured to bias the FAO cover member to cover the FAO passage in response to the application of the low-frequency excitation in the rebound direction.

3. The damper assembly of claim 1, further comprising: a damper rod extending along the center axis and including a rod end located within the main chamber;
   wherein the piston is attached to the damper rod adjacent to the rod end;
   wherein the piston further comprises a guiding sleeve disposed about the damper rod; and
   wherein the tappet has ring shape disposed around and engaging the guiding sleeve.

4. The damper assembly of claim 3, wherein the piston further comprises a compression valve assembly configured to regulate fluid flow from the compression chamber to the rebound chamber during a compression stroke, the compression valve assembly including a compression disc stack disposed annularly around the guiding sleeve.

5. The damper assembly of claim 3, wherein the guiding sleeve includes a distal tubular portion disposed coaxially with and tightly against the damper rod; and
   wherein the tappet is disposed around the distal tubular portion and is configured to slide therealong.

6. The damper assembly of claim 5, wherein the distal tubular portion of the guiding sleeve includes an outer surface defining a first seal slot receiving a first O-ring seal for sealing against an inner surface of the tappet.

7. The damper assembly of claim 6, wherein the guiding sleeve further includes a disc-shaped portion that extends annularly around the damper rod and radially outwardly from the distal tubular portion;
   wherein the tappet includes an inner tubular portion disposed around the distal tubular portion of the guiding sleeve and configured to slide therealong;
   wherein the tappet further includes a flange portion and an outer tubular portion, the flange portion having an annular shape extending radially outwardly from the inner tubular portion, the outer tubular portion extending annularly around the flange portion; and
   wherein the outer tubular portion of the tappet is disposed annularly around the disc-shaped portion of the guiding sleeve and configured to slide therealong.

8. The damper assembly of claim 7, wherein the tappet and the guiding sleeve together define a tappet chamber extending between the flange portion of the tappet and the disc-shaped portion of the guiding sleeve; and
   wherein the tappet chamber is in fluid communication with the rebound chamber via a balance passage.

9. The damper assembly of claim 7, wherein the disc-shaped portion of the guiding sleeve includes an outer surface defining a second seal slot with a second O-ring seal disposed therein and sealing against an inner surface of the outer tubular portion of the tappet.

10. The damper assembly of claim 3, wherein the tappet defines at least in part, a tappet chamber; wherein the tappet chamber is in fluid communication with the rebound chamber via a balance passage; and wherein the guiding sleeve defines, at least in part, the balance passage.

11. The damper assembly of claim 10, wherein the guiding sleeve includes a proximal tubular portion having a tubular shape disposed around the damper rod and spaced apart therefrom to define, at least in part, the balance passage therebetween.

12. The damper assembly of claim 1, wherein the tappet defines, at least in part, a tappet chamber;

wherein the tappet chamber is in fluid communication with the rebound chamber via a balance passage; and wherein the FAO valve assembly further comprises a control orifice configured to restrict fluid flow between the rebound chamber and the tappet chamber.

13. The damper assembly of claim 12, further comprising a damper rod extending along the center axis and including a rod end located within the main chamber;

wherein the piston is attached to the damper rod adjacent to the rod end;

wherein the damper rod includes a rod body having a first diameter, a rod shoulder spaced apart from and facing toward the rod end, and a rod extension extending from the rod shoulder to the rod end and having a second diameter smaller than the first diameter; and wherein the FAO valve assembly further comprises a valve control disc disposed around the rod extension and defining, at least in part, the control orifice.

14. A piston for a damper assembly, comprising:

a piston body defining a frequency-adaptive orifice (FAO) passage for providing fluid communication between a compression chamber and a rebound chamber;

an FAO valve assembly having an FAO cover member configured to cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency; and the FAO valve assembly further comprising a tappet configured to translate relative to the piston body to bias the FAO cover member to cover the FAO passage in response to the application of the low-frequency excitation in an at least one of a compression direction or a rebound direction opposite the compression direction, wherein the piston further comprises a guiding sleeve; and wherein the tappet has ring shape disposed around and engaging the guiding sleeve, wherein the guiding sleeve includes a distal tubular portion having a tubular shape; and wherein the tappet is disposed around the distal tubular portion and is configured to slide therealong, wherein the guiding sleeve further includes a disc-shaped portion that extends radially outwardly from the distal tubular portion;

wherein the tappet includes an inner tubular portion disposed around the distal tubular portion of the guiding sleeve and configured to slide therealong;

wherein the tappet further includes a flange portion and an outer tubular portion, the flange portion having an annular shape extending radially outwardly from the inner tubular portion, the outer tubular portion extending annularly around the flange portion; and wherein the outer tubular portion of the tappet is disposed annularly around the disc-shaped portion of the guiding sleeve and configured to slide therealong.

15. A damper assembly comprising:

a housing having a tubular shape extending along a center axis;

a piston movable through the housing along the center axis;

a body defining a frequency-adaptive orifice (FAO) passage providing fluid communication between a first chamber and a second chamber;

an FAO valve assembly having an FAO cover member configured to cover the FAO passage to block fluid flow therethrough in response to application of a low-frequency excitation below a predetermined frequency, the FAO valve assembly further configured to allow fluid flow through the FAO passage in response to application of a high-frequency excitation above the predetermined frequency; and the FAO valve assembly further comprising a tappet configured to translate relative to the body to bias the FAO cover member to cover the FAO passage in response to the application of the low-frequency excitation in an at least one of a compression direction or a rebound direction opposite the compression direction, wherein the housing defines a main chamber, the piston divides the main chamber into a compression chamber and a rebound chamber, the first chamber includes the compression chamber, and the second chamber includes the rebound chamber; and wherein the piston includes a piston body and the piston body is the body defining the FAO passage, wherein the damper assembly further comprises: a damper rod extending along the center axis and including a rod end located within the main chamber;

wherein the piston is attached to the damper rod adjacent to the rod end;

wherein the piston further comprises a guiding sleeve disposed about the damper rod; and wherein the tappet has ring shape disposed around and engaging the guiding sleeve, wherein the guiding sleeve includes a distal tubular portion disposed coaxially with and tightly against the damper rod; and wherein the tappet is disposed around the distal tubular portion and is configured to slide therealong, wherein the distal tubular portion of the guiding sleeve includes an outer surface defining a first seal slot receiving a first O-ring seal for sealing against an inner surface of the tappet, wherein the guiding sleeve further includes a disc-shaped portion that extends annularly around the damper rod and radially outwardly from the distal tubular portion;

wherein the tappet includes an inner tubular portion disposed around the distal tubular portion of the guiding sleeve and configured to slide therealong;

wherein the tappet further includes a flange portion and an outer tubular portion, the flange portion having an annular shape extending radially outwardly from the inner tubular portion, the outer tubular portion extending annularly around the flange portion; and wherein the outer tubular portion of the tappet is disposed annularly around the disc-shaped portion of the guiding sleeve and configured to slide therealong.

* * * * *